United States Patent Office 2,899,410
Patented Aug. 11, 1959

2,899,410

MANUFACTURE OF HIGHLY POLYMERIC POLY-METHYLENE TEREPHTHALATES

Norman Standring, Harrogate, England, assignor to Imperial Chemical Industries Limited, London, England, a corporation of Great Britain No Drawing. Application September 24, 1956
Serial No. 611,744

Claims priority, application Great Britain October 7, 1955

2 Claims. (Cl. 260—75)

This invention relates to the manufacture of highly polymeric polymethylene terephthalates, more particularly to a copolyester from ethylene glycol, 1:4 butane diol and terephthalic acid.

Polyethylene terephthalate and polytetramethylene terephthalate are polyesters suitable for the manufacture of fibre and film-forming materials, having softening points of 260° C. and 230° C. respectively.

We have now found that by copolymerising ethylene glycol terephthalate with tetramethylene glycol terephthalate, the process may be carried out at lower temperatures which permit the use of large quantities of catalyst in the copolyester forming reaction, giving faster reaction times. If the diol reaction charges from which these copolyesters are to be formed contain at least 89 moles percent of ethylene glycol but not more than 95 moles percent, the resulting copolyesters have melting points between that of polyethylene terephthalate and polytetramethylene terephthalate and have excellent fibre and film forming properties.

More specifically the softening points of these copolyesters lie in the range 230–245° C. and can therefore be melt polycondensed at low temperatures e.g. 250° C. Much higher catalyst concentrations can therefore be used than is possible in the melt polycondensation of polyethylene terephthalate, resulting in reduced cycle times without the accompanying disadvantages such as high rate of discolouration.

According to the present invention we provide a process for the manufacture of a copolyester from ethylene glycol, 1:4 butane diol and terephthalic acid, or functional derivatives thereof, wherein the ethylene glycol in the diol charge of the reaction mixture for the formation of said copolyesters is present to an extent of at least 89 moles percent but not more than 95 moles percent.

Examples of the functional derivatives of terephthalic acid which may be used are half esters, esters including cyclo-aliphatic esters and aryl esters, ester halides and ammonium or amine salts. In the preferred process of our invention we react ethylene glycol and 1:4 butane diol with dimethyl terephthalate.

If the copolyester is required in a delustred form, a small amount, e.g. 0.5% of titanium dioxide may be added to the reaction mixture. Any suitable ester-interchange and/or polycondensation catalyst may be used in the copolyester forming reaction and we have found litharge and zinc oxide especially suitable for this purpose.

The following table gives examples illustrating the process of our invention but does not limit the scope thereof, together with a comparative example.

| Example | Composition | | Ester Interchange Time | | Polycondensation Time | | | | Softening Point, °C. | Polycondensation Temp., °C. |
|---|---|---|---|---|---|---|---|---|---|---|
| | Ethylene Glycol, M percent | 1:4 Butane diol, M percent | hr. | min. | Total | | Less than 1 mm. pressure | | | |
| | | | | | hr. | min. | hr. | min. | | |
| 1 | 95 | 5 | 2 | 16 | 1 | 42 | 1 | 00 | 245 | 250 |
| 2 | 92 | 8 | 2 | 20 | 1 | 45 | 1 | 00 | 237 | 250 |
| 3 | 89 | 11 | 2 | 24 | 1 | 49 | 1 | 04 | 230 | 250 |
| Comparative | 100 | | 4 | 35 | 2 | 50 | 1 | 26 | 260 | 275 |

In each example in the table are used 250 molar parts of the mixture of ethylene glycol and 1:4 butane diol in the proportions stated. These substances are heated for the time stated, the temperature rising through the range 150–215° C., with 100 molar parts of dimethyl terephthalate containing 0.15 part by weight of litharge as catalyst. The mixture so formed is polycondensed under the conditions tabulated to give copolyesters of softening points stated therein.

All the copolyesters so obtained are of suitable colour and viscosity for the manufacture of drawable fibres and films.

The comparative example is similarly undertaken but using 0.015 part by weight of zinc acetate and 0.02 part by weight of antimony oxide as the catalyst system.

The softening point of the copolyesters and that of the polyethylene terephthalate containing not more than 35% 1:4 butane diol, i.e. those obtained by the process of our invention is given by the equation, Softening point °C. = $258.7 - 2.77 \times$ moles percent 1:4 butane diol where the softening point of the polymer is the temperature at which a plunger weight 29.5 grams, circular cross section, $\frac{1}{10}''$ diameter sinks 0.02'' into the precrystallised polymer. The term moles percent butane diol refers to the initial composition of the mixed glycols.

The table thus shows that lower polycondensation temperatures can be employed, permitting the use of high catalyst concentrations with consequent improvement in cycle times, particularly ester-interchange time as compared with the conditions required for the formation of polyesters from ethylene glycol alone.

Filaments and fibres obtained from the copolyesters which are the subject of the present invention exhibit increased dye uptake over the homopolyester, polyethylene terephthalate.

What we claim is:

1. A process for the manufacture of dyeable fiber- and film-forming copolyesters of polymethylene terephthalate having a softening point between about 230° and 240° C., which comprises reacting a glycol mixture containing between 89 and 95 mol percent of ethylene glycol and between 11 and 5 mol percent of tetramethylene glycol with dimethyl terephthalate, under heating at a temperature between 150–215° C. to bring about ester-interchange, followed by heating under polycondensation conditions at a temperature of substantially about 250° C. and in the presence of litharge as an ester-interchange and polycondensation catalyst.

2. Copolyesters of ethylene glycol and tetramethylene glycol and terephthalic acid produced by the process according to claim 1.

References Cited in the file of this patent

UNITED STATES PATENTS

| | | |
|---|---|---|
| 2,465,319 | Whinfield | Mar. 22, 1949 |
| 2,534,028 | Izard | Dec. 12, 1950 |